United States Patent [19]

Weber

[11] Patent Number: 4,932,240
[45] Date of Patent: Jun. 12, 1990

[54] ARTICULATING AIR PLUG GAGE
[75] Inventor: Jerome B. Weber, Oshkosh, Wis.
[73] Assignee: Brunswick Corporation, Skokie, Ill.
[21] Appl. No.: 377,891
[22] Filed: Jul. 10, 1989
[51] Int. Cl.⁵ .............................................. G01B 13/10
[52] U.S. Cl. ...................................................... 73/37.9
[58] Field of Search .............................. 73/37.5, 37.9; 33/DIG. 2

[56] References Cited
U.S. PATENT DOCUMENTS 3,494,078  2/1970  Miyamoto ............................ 73/37.9
4,433,591  2/1984  Snow, Jr. .............................. 73/37.5

OTHER PUBLICATIONS

Federal Products Corporation Catalog 71D, 1971, A Subsidiary of Esterline Corporation, 1144 Eddy St., Providence, RI 02901.

Primary Examiner—Hezron E. Williams
Attorney, Agent, or Firm—Andrus, Sceales, Starke & Sawall

[57] ABSTRACT

An air gage (10) is provided for measuring an otherwise inaccessible right angle opening (12) in a confined spaced in a workpiece (14). An air plug (18) extends axially into the opening (12) and has a central air passage (22) communicating with one or more transverse air passages (24 and 26) directing air outwardly of the plug (18) and against the workpiece (14) in the opening (12). A collar (40) mounted to the plug (18) has an air passage (60) therethrough communicating with the central air passage (22) in the plug (18). The collar (40) has a generally cylindrical cavity (50) forming a socket with an arcuate opening (74) in a cylindrical sidewall (66) subtending a given arc. An extension arm (36) has an inner cylindrical end (52) received in the cylindrical cavity (50), and has a tubular rod (76) extending from the inner cylindrical end (52) outwardly through the arcuate opening (74) in the cylindrical sidewall (66) and movable along the noted arc to articulate and pivot the extension arm (36) by pivoting the inner cylindrical end (52) in the cavity (50) about a pivot axis (42) along the cylindrical axis of the cavity (50), which axis (42) is perpendicular to the axis (20) of axial extension of the plug (18). The extension arm (36) has an internal air passage (38, 78, 64, 62) through the tubular rod (76) and the inner cylindrical end (52) communicating with the air passage (60) in the collar (40). The degree of articulation of the extension arm (36) is determined by the arc subtended by the arcuate opening (74) in the collar (40), which articulation facilitates access to otherwise inaccessible openings in workpieces.

13 Claims, 3 Drawing Sheets

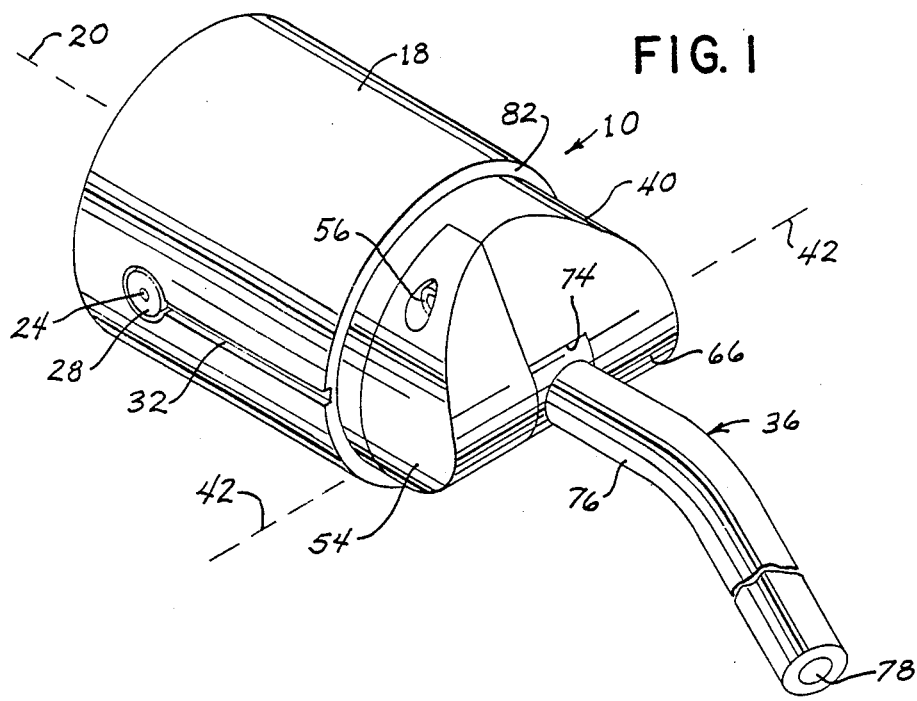
FIG. 1
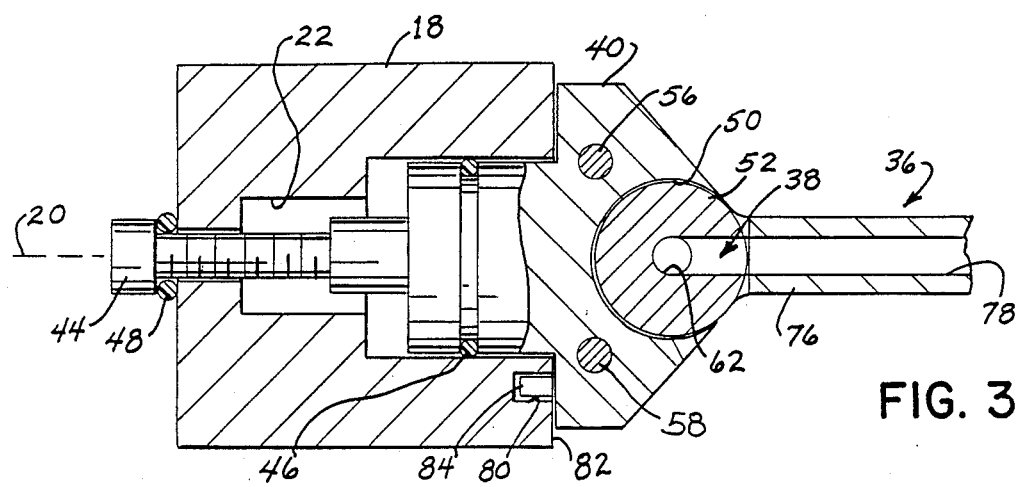
FIG. 3
FIG. 4

ARTICULATING AIR PLUG GAGE

BACKGROUND AND SUMMARY

The invention relates to air gages for measuring openings in workpieces.

Air gages are known in the prior art for measuring dimensions of openings in workpieces, including diameter, taper, regularity, concentricity, roundness, etc. The gage works on the principle of differing air pressure with differing clearances of an air plug in an opening in the workpiece, for example as discussed in Federal Products Corporation Catalog 71D, 1971, a subsidiary of Esterline Corporation, 1144 Eddy Street, Providence, R.I. 02901.

The present invention addresses and solves a particular need in marine applications, though the invention is not limited thereto. In marine applications, there is a need to measure openings in workpieces which make right angle turns, i.e. a main opening extends into the workpiece and another opening extends perpendicularly therefrom. Prior art air gages cannot measure the latter opening. Despite repeated inquiries over the past 10 years, no gage manufacturer has produced a device capable of measuring such inaccessible areas. Right angle air plug gages are available, but none can work within confined spaces. The present invention provides an articulating air plug gage enabling access to such otherwise previously inaccessible openings in workpieces.

BRIEF DESCRIPTION OF THE DRAWINGS

FIG. 1 is a perspective view of an air gage constructed in accordance with the invention.

FIG. 3 is a sectional view of the air gage of FIG. 1.

FIG. 4 is another sectional view of the air gage of FIG. 1 taken at 90° from the section of FIG. 3.

DETAILED DESCRIPTION

Figure 2:
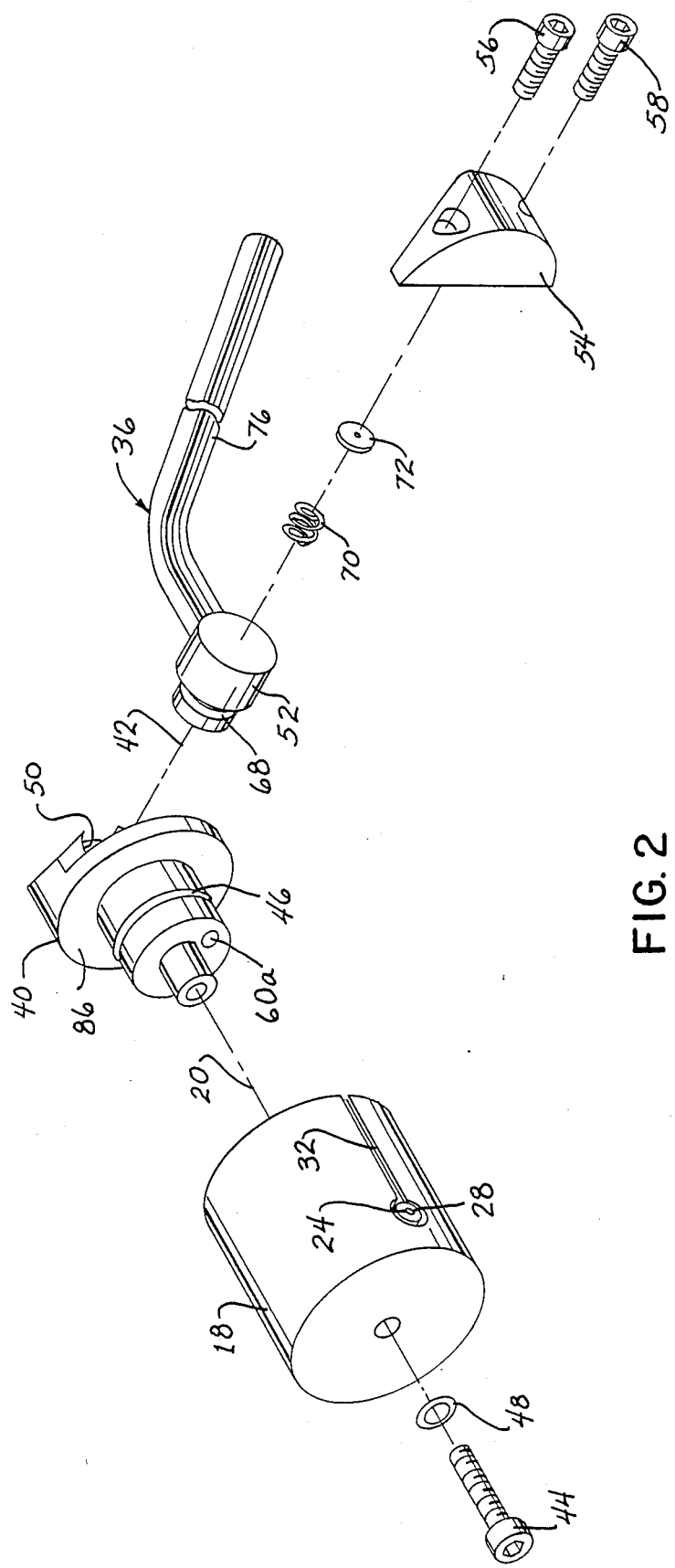
FIG. 2 is an exploded perspective view of the air gage of FIG. 1.
Figure 6:
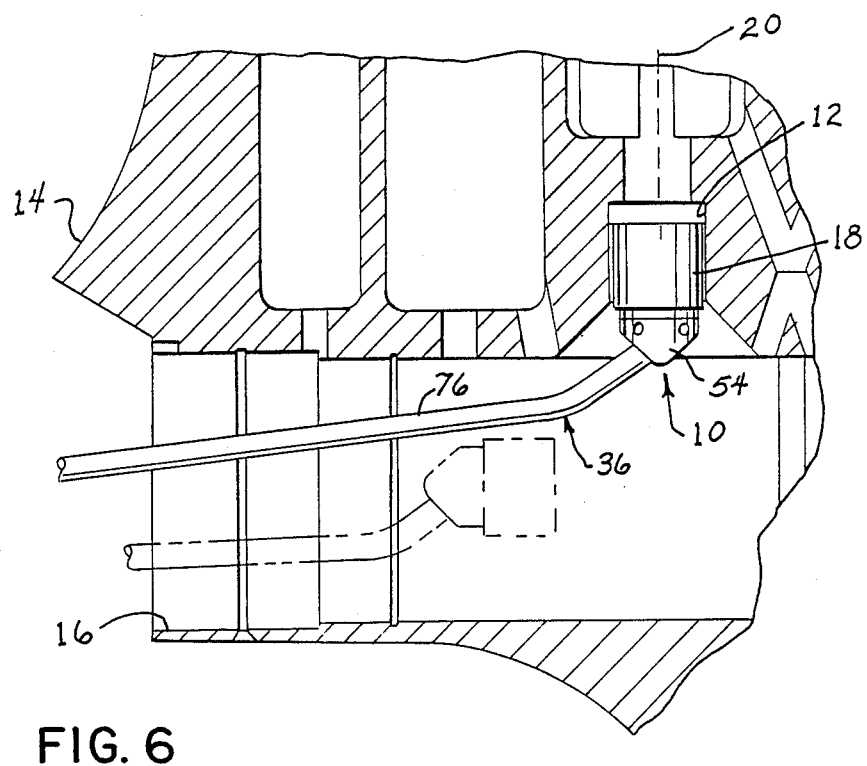
FIG. 6 a side view partially in section showing insertion of the air gage of FIG. 1 into an opening in a workpiece.

FIGS. 1 and 2 show an air gage 10 for measuring an opening 12, FIG. 6, in a workpiece 14. Opening 12 extends perpendicularly from opening 16 in the workpiece.

The gage includes a plug 18 extending axially along axis 20 into opening 12 and having a central air passage 22, FIG. 4, communicating with one or more transverse air passages 24 and 26 directing air through metering jets 28 and 30 outwardly of plug 18 and against workpiece 14 in opening 12, which air can escape through channels 32 and 34. The air pressure is measured in accordance with the techniques known in the prior art, and for further background, reference is made to the above noted Federal Products Corporation Catalog 71D.

An extension arm 36 has an internal passage 38, FIG. 4, communicating with central air passage 22 in plug 18 to direct air thereto. Extension arm 36 is pivotally mounted to plug 18 by a collar 40 to pivot about a pivot axis 42 which is perpendicular to the axis 20 of axial extension of plug 18 to allow articulation of plug 18 and extension arm 36 relative to each other, as shown in dashed and solid lines in FIG. 6, to facilitate access to otherwise inaccessible openings in workpieces. Collar 40 is retained in plug 18 by bolt 42, and air passage 22 is sealed by O-rings 46 and 48.

Collar 40 has a socket formed by a generally cylindrical cavity 50, FIGS. 3 and 4, extending along an axis coincident with pivot axis 42 of extension arm 36. The extension arm has an inner cylindrical end 52, FIGS. 2 and 3, received in socket cavity 50 in pivoting relation. The collar includes a removable closure cap 54, FIG. 2, mounted to the collar by bolts 56 and 58 and closing cavity 50 and retaining inner end 52 of the extension arm in cavity 50.

Collar 40 has an air passage 60, FIG. 4, communicating at one end 60a with central air passage 22 in plug 18, and at the other end 60b with socket cavity 50. Air passage 60 extends diagonally and crosses axis 20 of plug 18. Closure cap 54 is at one end 50a of cavity 50. Inner end 52 of extension arm 36 communicates with the noted other end 60b of air passage 60 at the other end 50b of cavity 50. Cavity 50 in collar 40 is open at end 50a and receives inner end 52 of extension arm 36 therein, and is closed at end 50b and communicates with air passage 60 in collar 40. Inner end 52 of extension arm 36 has a central passage 62 along an axis coincident with pivot axis 42 and communicating through a right angle turn 64 with the remainder of the passage 38 in the extension arm extending externally of cavity 50 through a cylindrical sidewall 66 thereof. An O-ring seal 68 is around cylindrical inner end 52 of the extension arm between turn 64 and the noted other end 60b of air passage 60. Spring 70 bears between plate 72 at closure cap 54 and inner end 52 of the extension arm on the opposite side of turn 64 from O-ring seal 68, and biases inner end 52 of the extension arm along pivot axis 42 toward the noted other end 50b of cavity 50.

Socket cavity 50 has an arcuate opening 74 in cylindrical sidewall 66 subtending a given arc. Extension arm 36 includes a tubular rod 76 extending from inner cylindrical end 52 outwardly through arcuate opening 74 in cylindrical sidewall 66 and movable along the noted arc to articulate and pivot extension arm 36 by pivoting inner cylindrical end 52 in cavity 50 about pivot axis 42 along the cylindrical axis of cavity 50. As above noted, axis 42 is perpendicular to the axis 20 of axial extension of plug 18. Extension arm 36 has an internal air passage 78 through tubular rod 76 which in combination with turn 64 and passage 62 provides air passage 38 through extension arm 36 which communicates with air passage 60 in collar 40 at the noted other end 50b of cavity 50. The degree of articulation of extension arm 36 is determined by the arc subtended by arcuate opening 74 in cylindrical sidewall 66 of cavity 50 in collar 40, which articulation, as above noted, facilitates access to otherwise inaccessible openings in workpieces.

Figure 5:
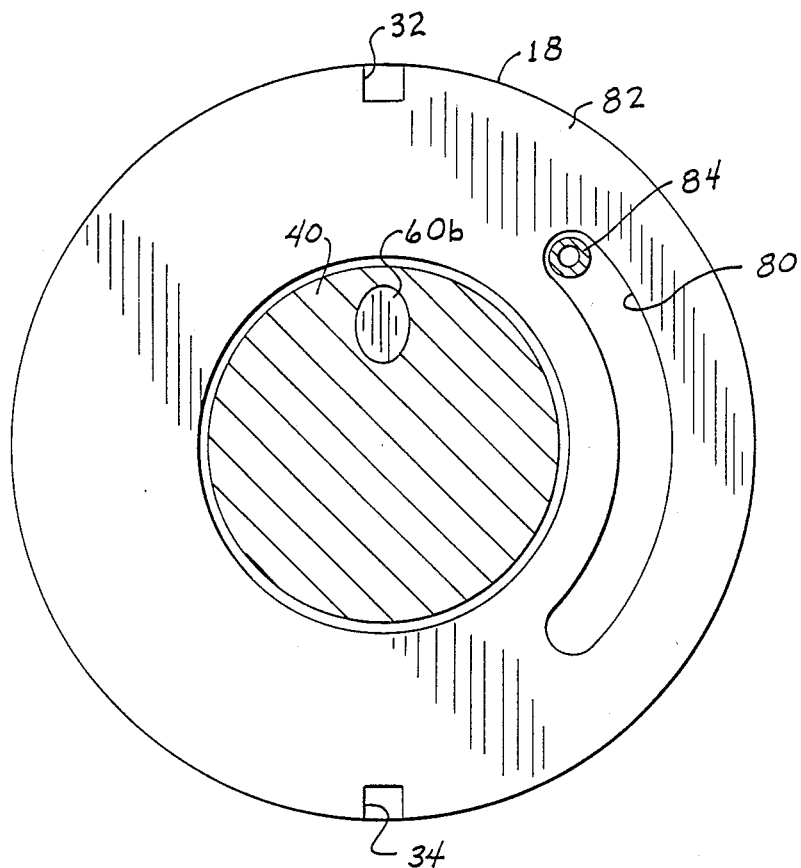
FIG. 5 is a sectional view taken along line 5—5 of FIG. 4.

If desired, limited rotation of collar 40 in plug 18 about axis 20 may be provided by an arcuate slot 80, FIG. 5, cut into face 82 of plug 18, and receiving a finger or stud 84 attached to the facing surface 86, FIG. 4, of collar 40.

It is recognized that various equivalents, alternatives and modifications are possible within the scope of the appended claims.

I claim:

1. An air gage for measuring an opening in a workpiece, comprising a plug extending axially into said opening and having a central air passage communicating with one or more transverse air passages directing air outwardly of said plug and against said workpiece in said opening to measure transverse dimensions across said opening, not axial dimensions nor axial proximity sensing, an extension arm having an internal air passage communicating with said central air passage in said plug to direct air thereto and pivotally mounted to said plug to pivot about an axis different than the axis of axial extension of said plug in said opening to allow articulation of said plug and said extension arm relative to each other to facilitate access to otherwise inaccessible openings in workpieces.

2. The invention according to claim 1 wherein said extension arm is mounted to said plug by a collar having a socket receiving said extension arm in pivoting relation and having an air passage communicating at one end with said central air passage in said plug and at the other end with said socket.

3. The invention according to claim 2 wherein said pivot axis of said extension arm is perpendicular to said axis of said plug.

4. An air gage for measuring an opening in a workpiece, comprising a plug extending axially into said opening and having a central air passage communicating with one or more transverse air passages directing air outwardly of said plug and against said workpiece in said opening, an extension arm having an internal air passage communicating with said central air passage in said plug to direct air thereto and pivotally mounted to said plug to pivot about an axis different than the axis of axial extension of said plug in said opening to allow articulation of said plug and said extension arm relative to each other to facilitate access to otherwise inaccessible openings in workpieces, wherein said extension arm is mounted to said plug by a collar having a socket receiving said extension arm in pivoting relation and having an air passage communicating at one end with said central air passage in said plug and at the other end with said socket, said pivot axis of said extension arm is perpendicular to said axis of said plug, said socket in said collar comprises a generally cylindrical cavity extending along an axis coincident with said pivot axis of said extension arm, said extension arm has an inner end received in said cavity, and said collar includes a removable closure cap mounted to said collar and closing said cavity and retaining said inner end of said extension arm in said cavity.

5. The invention according to claim 4 wherein said closure cap is at one end of said cavity, and said inner end of said extension arm communicates with said other end of said air passage in said collar at the other end of said cavity.

6. The invention according to claim 5 wherein said inner end of said extension arm is cylindrical and has a central passage along an axis coincident with said pivot axis and communicating through a turn with the remainder of said passage in said extension arm extending externally of said cavity through a cylindrical sidewall of said cavity, and comprising an O-ring seal around said cylindrical inner end of said extension arm between said turn and said other end of said air passage in said collar.

7. The invention according to claim 6 comprising biasing means bearing between said closure cap and said inner end of said extension arm on the opposite side of said turn from said O-ring seal, said biasing means biasing said inner end of said extension arm along said pivot axis toward said other end of said cavity.

8. The invention according to claim 6 wherein said air passage in said collar extends diagonally and crosses said axis of said plug.

9. An air gage for measuring an opening in a workpiece, comprising a plug extending axially into said opening and having a central air passage communicating with one or more transverse air passages directing air outwardly of said plug and against said workpiece in said opening, a collar mounted to said plug and having an air passage therethrough communicating with said central air passage in said plug, said collar having a generally cylindrical cavity forming a socket with an arcuate opening in a cylindrical sidewall subtending a given arc, an extension arm having an inner cylindrical end received in said cylindrical cavity and having a tubular rod extending from said inner cylindrical end outwardly through said arcuate opening in said cylindrical sidewall and movable along said arc to articulate and pivot said extension arm by pivoting said inner cylindrical end in said cavity about a pivot axis along the cylindrical axis of said cavity, which axis is perpendicular to the axis of axial extension of said plug, said extension arm having an internal air passage through said tubular rod and said inner cylindrical end communicating with said air passage in said collar, the degree of articulation of said extension arm being determined by the arc subtended by said arcuate opening in said cylindrical sidewall of said cavity in said collar, said articulation facilitating access to otherwise inaccessible openings in workpieces.

10. The invention according to claim 9 wherein the air passage in said inner end of said extension arm extends along an axis coincident with the pivot axis of said extension arm and at an angle relative to said air passage in said rod.

11. The invention according to claim 10 wherein said air passage in said inner end of said extension arm is perpendicular to said axis of said plug.

12. The invention according to claim 11 wherein said air passage in said collar extends diagonally and crosses said axis of said plug.

13. The invention according to claim 10 wherein said cavity in said collar is open at one end and receives said inner end of said extension arm therein, and is closed at the other end and communicates with said air passage in said collar, and comprising an end cap mounted to said collar and closing said one end of said cavity and retaining said inner end of said extension arm in said cavity with said rod extending through said arcuate opening in said cylindrical sidewall.

* * * * *